United States Patent
Gustin

(10) Patent No.: US 7,593,409 B2
(45) Date of Patent: Sep. 22, 2009

(54) APPARATUS AND METHODS FOR MONITORING NETWORK TRAFFIC

(75) Inventor: Jay W. Gustin, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 657 days.

(21) Appl. No.: 11/321,564

(22) Filed: Dec. 29, 2005

(65) Prior Publication Data

US 2007/0153694 A1 Jul. 5, 2007

(51) Int. Cl.
*H04L 12/28* (2006.01)
*H04L 12/66* (2006.01)

(52) U.S. Cl. ............... 370/395.4; 370/352; 370/389

(58) Field of Classification Search ........... 370/240, 370/242, 245, 251, 252, 230, 231, 395.1, 370/395.4, 389, 352; 709/220, 221, 222, 709/224; 700/18, 26, 23, 28, 52, 53, 37
See application file for complete search history.

(56) References Cited

U.S. PATENT DOCUMENTS

| | | | |
|---|---|---|---|
| 6,076,115 A | 6/2000 | Sambamurthy et al. | |
| 6,108,713 A | 8/2000 | Sambamurthy et al. | |
| 6,219,706 B1 | 4/2001 | Fan et al. | |
| 6,327,677 B1 * | 12/2001 | Garg et al. | 714/37 |
| 6,510,154 B1 | 1/2003 | Mayes et al. | |
| 6,529,780 B1 | 3/2003 | Soergel et al. | |
| 6,587,884 B1 | 7/2003 | Papadopoulos et al. | |
| 6,760,782 B1 | 7/2004 | Swales | |
| 6,826,697 B1 | 11/2004 | Moran | |
| 6,930,978 B2 | 8/2005 | Sharp et al. | |
| 6,963,922 B2 | 11/2005 | Papadopoulos et al. | |
| 7,269,157 B2 * | 9/2007 | Klinker et al. | 370/351 |
| 7,453,822 B2 * | 11/2008 | Van Slyke et al. | 370/252 |
| 7,457,870 B1 * | 11/2008 | Lownsbrough et al. | 709/224 |
| 2004/0146006 A1 | 7/2004 | Jackson | |
| 2007/0027984 A1 * | 2/2007 | Jorgensen et al. | 709/224 |

FOREIGN PATENT DOCUMENTS

| | | |
|---|---|---|
| EP | 1545058 A2 | 6/2005 |
| WO | WO 97/03549 A | 2/1997 |

* cited by examiner

*Primary Examiner*—Hanh Nguyen
(74) *Attorney, Agent, or Firm*—Munck Carter, LLP

(57) ABSTRACT

Devices, systems and methods for network traffic monitoring for a process control network are disclosed. The exemplary system may include a connection to a physical media and a connection to a media access controller of the process control network. The system may also include a filter having a position identifier, a data comparator, a counter, and an access controller. The position identifier may determine the position of relevant data within a packet. The data comparator may compare the relevant data to predetermined criterion. The counter may count the amount of packets transmitted to the media access controller that do not match the predetermined criterion during a specified period. The access controller may pass packets to the media access controller if the relevant data matches the predetermined criterion or a predetermined amount of packets have not been transmitted.

20 Claims, 4 Drawing Sheets

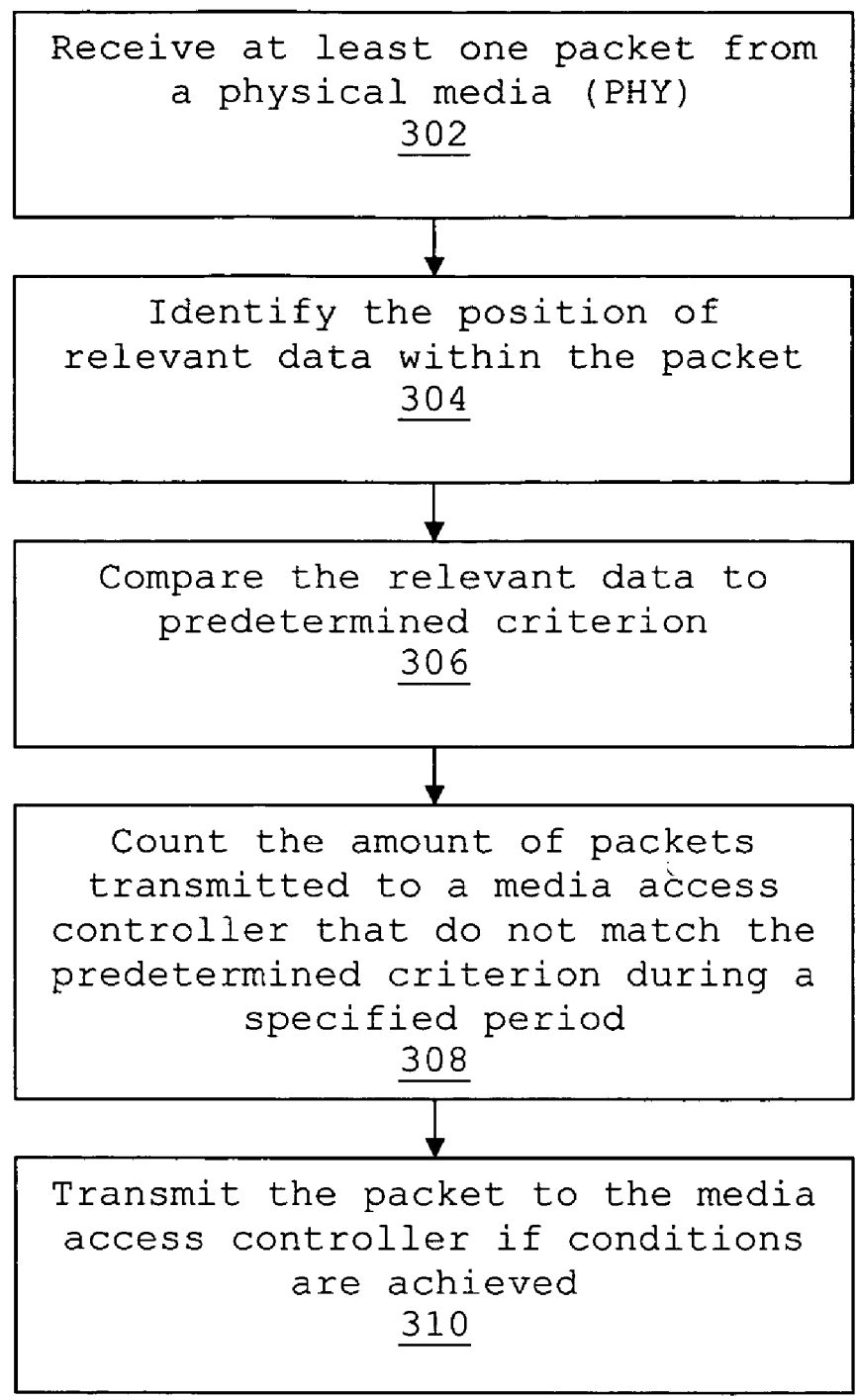

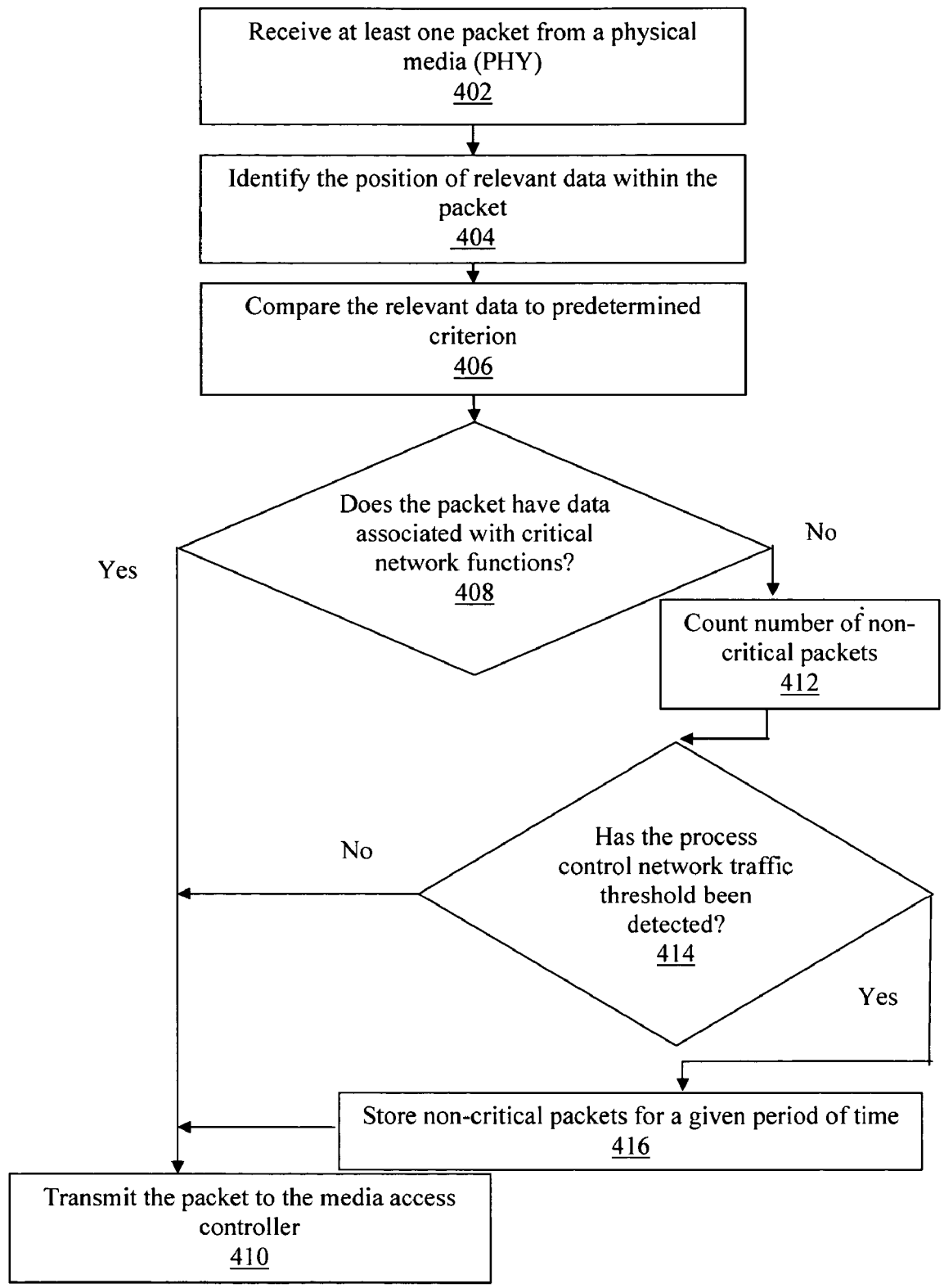

APPARATUS AND METHODS FOR MONITORING NETWORK TRAFFIC

FIELD OF THE INVENTION

The present invention relates generally to computer networks, and more particularly to controlling network traffic.

BACKGROUND OF THE INVENTION

Networks provide communications from one node located on a network to other nodes located on the network. The nodes are typically personal computers, workstations, file or print servers, or any other suitable device and utilize the network to communicate information to other nodes on the network. For example, a workstation on a network may communicate with a server or a printer over the network. In a more basic network, a sensor may communicate information to a base computer which may communicate information to a mechanical actuator. The base computer may communicate with a variety of sensors and a mechanical actuator to perform a desired operation.

Those skilled in the art will appreciate that there are many different types of networks. For example, the network may be a Local Area Network (LAN). The nodes on the LAN may communicate with other LANs via, for example, a Wide Area Network (WAN). To provide routing of the data within a network and to various other connected networks, the network may use equipment to facilitate routing of data. For example, switches, routers, hubs, or bridges may be used to transmit and communicate data between nodes and networks.

The network may use one or more protocols to allow the nodes to receive and transmit data. One of the most commonly used protocols is Ethernet. Ethernet allows nodes to package and transmit data to a desired node, and, once received, unpackage the data at the desired node.

A process control network (PCN) is a communications network that is used to transmit instructions and data between control and measurement nodes and equipment. Ethernet switches are part of a process control network and act as conduits to transfer packets of data within process control network nodes. Ethernet switches logically partition these packets to travel directly between their source and their destination.

Each node on a network has a unique network address called a data link control (DLC) address or media access control (MAC) address. Sending the packets directly to the desired media access control address increases security as users at varying nodes are less apt to access other users' data. By sending the packets directly to the desired location and reducing the number of packets on other segments, the overall performance and efficiency are improved. Process control networks place a high emphasis on expedient and deterministic throughput of data, while minimizing internal and external interference. Details of process control networks are disclosed in, for example, ANSI/ISA -95.00.01-2000 *Enterprise-Control System Integration Part 1: Models*, (ANSI/ISA 2000) and ANSI/ISA-95.00.02-2001 *Enterprise-Control System Integration Part 2: Object Model Attributes: Object Model Attributes*, (ANSI/ISA 2001), as well as, *A Reference Model for Computer Integrated Manufacturing* (CIM) (Theodore J. Williams et al., 2d ed., Instrument Society of America 1989).

Accordingly, an efficient and effective system and method are needed for ensuring that the process control network is not interfered with by internal or external elements, preventing timely flow of critical data. In addition, systems and methods are needed to increase the overall efficiency of a network by reducing the volume of non-critical data through the network or halting the flow of this non-critical data until a better suited time.

SUMMARY OF THE INVENTION

It is, therefore, an objective of the present invention to provide devices, systems, and methods to monitor network traffic in a process control network.

In one embodiment, a network traffic monitoring device may allow network packets to be passed on to the media access controller if one of the following conditions is achieved: the relevant data matches the predetermined criterion or the predetermined threshold of packets has not been reached. In another embodiment, the network traffic monitoring device is an ingress to a Level 1 network and contains a filter that may be implemented using a field programmable gate array. In still another embodiment, the network traffic monitoring device may select relevant data from a group comprising: critical network housekeeping, network redundancy data, and process control mission data. In yet another embodiment, the network traffic monitoring device may signal an administrator if the relevant data does not match the predetermined criteria and a predetermined amount of non-critical packets have been transmitted.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which:

FIG. 3 is a flow chart illustrating a first exemplary embodiment of the present invention.

FIG. 4 is a flow chart illustrating a second exemplary embodiment of the present invention.

DETAILED DESCRIPTION OF THE INVENTION

Figure 1:
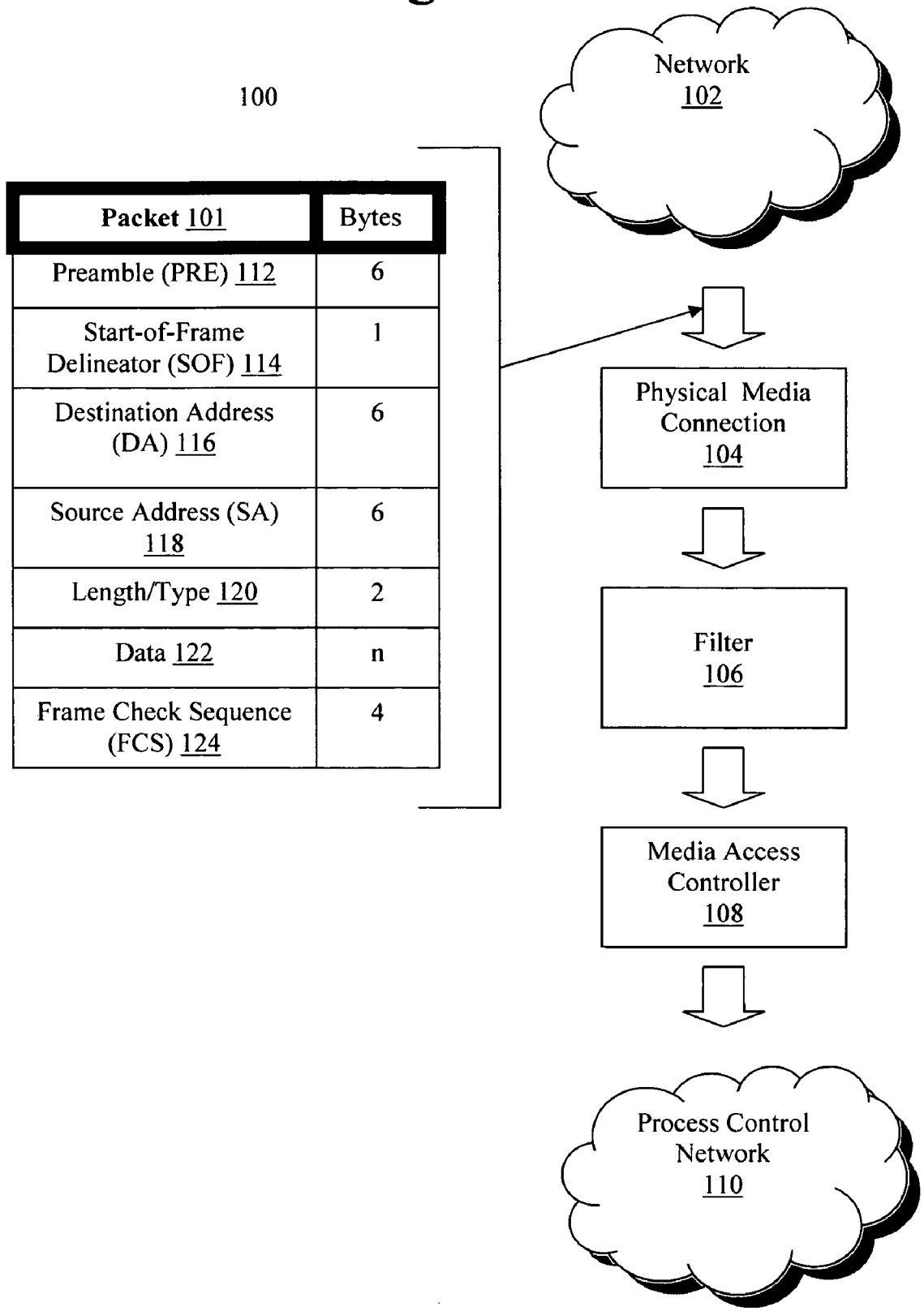
FIG. 1 is a generalized schematic of an exemplary Ethernet communications network according to an exemplary embodiment of the present invention.

Network link 100, as shown in FIG. 1, provides nodes with additional elements to monitor and filter network traffic communication. Packets 101 of data are transferred from originating node or network 102 to process control network 110. This originating node or network 102 can take the form of, for example, a personal computer, workstation, file server, or any other suitable device.

Packets 101 of data may be stored in a standardized Ethernet frame format including the following seven fields: preamble (PRE) 112, start-of-frame delineator (SOF) 114, destination address (DA) 116, source address (SA) 118, length/type 120, data payload 122, and frame check sequence (FCS) 124, as shown in FIG. 1.

Preamble (PRE) 112 consists of six bytes of data and is an alternating pattern of ones and zeros that tells the receiving node that a frame is coming, and provides a means to synchronize the frame-reception portions of receiving physical layers with the incoming bit stream. Start-of-frame delineator (SOF) 114 may include one byte of data and is an alternating pattern of ones and zeros, ending with two consecutive 1-bits indicating that the next bit is the left-most bit in the left-most byte of the destination address. Destination address (DA) 116 may include six bytes of data and identifies which station(s) should receive the frame. The left-most bit in the destination address (DA) field may indicate whether the address is an individual address (indicated by a 0) or a group address (indicated by a 1). The second bit from the left may indicate whether destination address (DA) 116 is globally administered (indicated by a 0) or locally administered (indicated by a 1). Source address (SA) 118 may include six bytes and identifies the sending station. Source address (SA) 118 is generally an individual address and the left-most bit in the SA field is generally "0". Length/type 120 may include two bytes of data and indicates the length/type of packet data. Data payload 122 is a sequence of "n" bytes of any value, where "n" is less than or equal to a set amount of bytes. If the length of data payload 122 field is less than 46 bytes, data payload 122 field may be extended by adding a filler (a pad) sufficient to bring the data field length to 46 bytes. Frame check sequence (FCS) 124 may include four bytes of data and contains a 32-bit cyclic redundancy check (CRC) value, which is created by a sending media access controller (MAC) and is recalculated by a receiving media access controller (MAC) to check for damaged frames. Frame check sequence (FCS) 124 is generated over the destination address (DA) 116, source address (SA) 118, length/type 120, and data payload 122 fields.

The physical media connection (PHY) 104 allows the frame packet 101 to travel from the physical hardware to the network media access controller (MAC) 108. The physical media connection (PHY) 104 may also be defined based on the hardware type and network interface. According to an exemplary embodiment, the physical media connection (PHY) 104 provides packets 101 and control signals to a filter 106. The filter 106 is placed between the physical media connection (PHY) 104 and the media access controller (MAC) 108 and accepts the packet 101 and control signals from the physical media connection (PHY) 104 and calculates, via a position identifier, the position in the data payload 122 of the indicators of the critical information within the data payload 122.

The filter 106, as shown in FIG. 1, may contain a comparator that determines if the data payload 122 passed from the physical media connection (PHY) 104 meets certain predetermined criterion before being passed on to the media access controller (MAC) 108. This criterion may include data related to, for example, data that is critical to the control mission. There may be other data related to, for example, critical network housekeeping and network redundancy maintenance, that are needed for operation but are not as critical to the control mission. Packets 101 that do not meet the predetermined critical control criterion, but are important for operation, are counted by a counter of the filter 106 and may only be allowed to pass on to the media access controller (MAC) 108 if the amount does not exceed a predetermined threshold over a given period, for example, 500 kilobits per second. The threshold may be based on, for example, the amount of network traffic the process control network 110 may handle or the acceptable packet loss rate based on network congestion that the process control network 110 may be designed to handle.

After the filter 106 passes on the critical packets and the predetermined amount of non-critical packets for the given period to a media access controller (MAC) 108, the filter 106 may withhold any packets 101 that could potentially interfere with the data flow to or within the process control network 110. According to another exemplary embodiment of the present invention, the filter 106 may drop or eliminate any non-critical packets that could potentially harm the efficient operation and packet flow of the process control network 110. Another embodiment of the present invention may have the filter 106 notify an administrator if any packets 101 are being held or eliminated before being passed along to the media access controller (MAC) 108 of the process control network 110 as shown in FIG. 1. In another embodiment, the filter 106 may utilize a queue in memory to store the packets 101 if any packets 101 are being held before being passed along to the process control network 110 as shown in FIG. 1.

Figure 2:
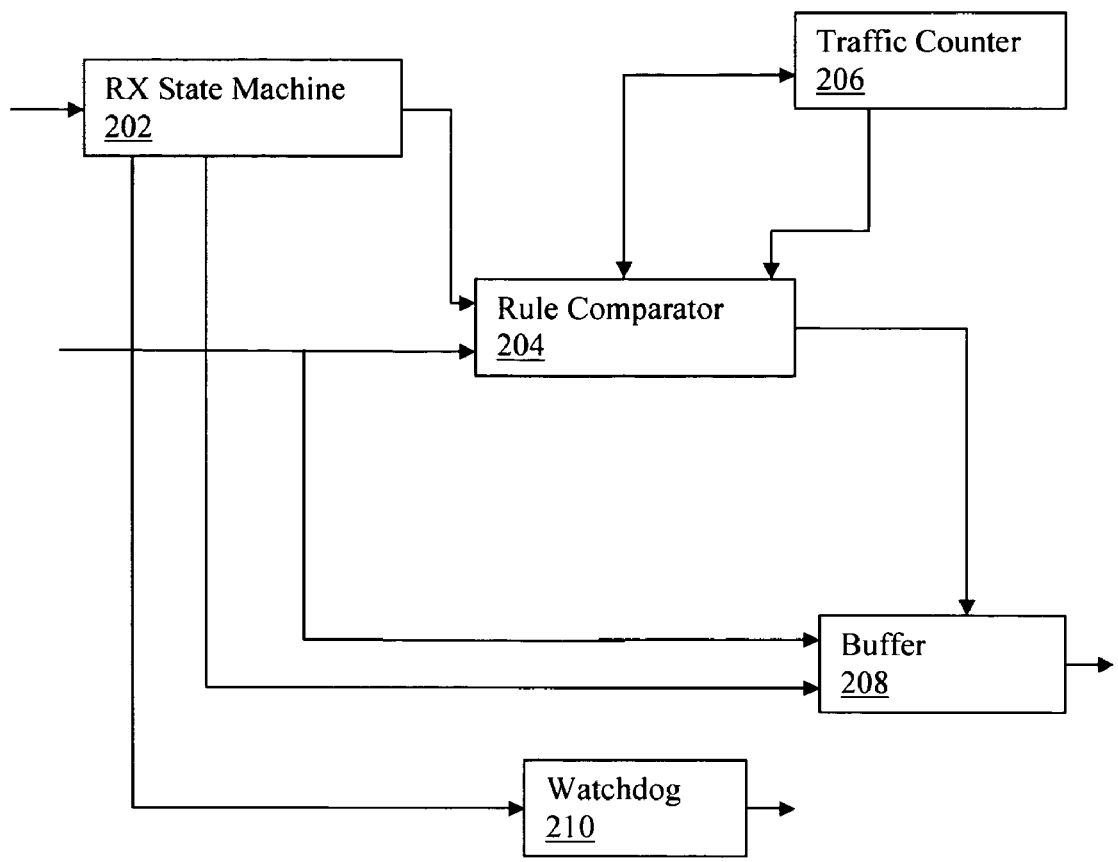
FIG. 2 is a block diagram of the Ethernet communications network filter according to an exemplary embodiment of the present invention.

FIG. 2 is a block diagram of an exemplary Ethernet communications network filter 106 used to implement embodiments of the present invention. According to the exemplary embodiment data, in the form of packets 101, are received by the filter 106. A received packet 101 may be used to initiate the RX state machine 202. The RX state machine 202 may be used to control the functions and other components of the filter 106. The packet 101 is sent to a rule comparator 204 and a data storage buffer 208. At the rule comparator 204 programmed rules are used as a position identifier to dissect the packet 101 to determine the location of relevant data. The rule comparator 204 may also have programmed rules used as a data comparator to compare the relevant data. The relevant data is compared to strings of data known to be included in critical packets. If the relevant data matches a string of data associated with the critical data, the packet 101 is determined to be a critical packet and is transmitted from the buffer 208 to the media access controller (MAC) 108 of the process control network 110. If the strings of data do not match the relevant data, the packet 101 is compared to strings of data known to be included in packets that are important to operation. The rule comparator 204 may determine if the network traffic important to operation of the process control network 110 has reached a threshold. If the threshold has not been achieved, the packet 101 is counted by the traffic counter 206 and transmitted to the media access controller (MAC) 108 of the process control network 110 from the buffer 208. If the threshold is achieved, the packet 101 may be dropped or stored for later transmission. The rule comparator 204 may use programmed rules as an access controller allowing packets 101 to be passed on to the media access controller (MAC) 108 if the above conditions are achieved.

The traffic counter 206 may be used in a variety of ways. For example, the traffic counter 206 may be used to determine all traffic that is passed to the process control network 110 or only a defined set of traffic passed to the process control network 110, for example, non-critical packets that are needed for operation.

The filter 106 may also have a watchdog 210. The watchdog 210 may be utilized to alert other network components or a network administrator of the status of the filter 106 or network traffic. For example, the watchdog 210 may alert a network administrator that the network traffic threshold has been reached and the filter 106 is dropping packets.

The filter 106 may be implemented using hardwired circuitry or a Field Programmable Gate Array (FPGA) program to perform the desired operations. Architecturally in terms of hardware, the filter 106 may also include a processor, memory, and one or more input and output interface devices. A local interface may have additional elements, which are omitted for simplicity, such as controllers, buffers (caches), drivers, repeaters, and receivers, to enable communications. Further, the local interface may include address, control, and/or data connections to enable appropriate communications among the components of a network.

The systems and methods may also be incorporated in software used with a computer or other suitable operating device of the filter. The software stored or loaded in the memory may include one or more separate programs, each of which comprises an ordered listing of executable instructions for implementing the methods and systems of the invention. The software may work in conjunction with an operating system. The operating system essentially controls the execution of the computer programs, such as the software stored within the memory, and provides scheduling, input-output control, file and data management, memory management, and communication control and related services. The systems and methods may also include a Graphic User Interface (GUI) to allow the administrator or user to enter constraints associated with the filter 106 managing network traffic.

FIG. 3 depicts a first exemplary embodiment of the present invention in a flowchart in which at least one packet of data may be passed by the physical media (PHY) 104 (block 302). The relevant data within the packet 101 may be identified (block 304). The filter 106 may ignore the following six fields within the data packet: preamble (PRE), the start-of-frame delineator (SOF), the destination address (DA), source address (SA), length/type and frame check sequence (FCS) and concentrate solely on the data payload 122 of the packet 101 for critical or non-critical data. The filter 106 may use, for example, a position and/or a sequence of data within the data payload 122 to determine the location of relevant data. The filter 106 may also identify relevant data in other above-discussed fields of the packet 101.

After the present invention determines the location of relevant data, the relevant data may be compared to the predetermined criterion (block 306). If the relevant data matches the predetermined criterion for critical control data, the packet 101 is passed to the media access controller (MAC) 108 of the process control network 110 (block 310). If the relevant data does not match the predetermined criterion for critical control data but matches the criterion for data important to operation and the limit in non-critical, operational data flow has not been reached, the packet 101 is counted (block 308) and passed to the media access controller (MAC) 108 of the process control network 110 (block 310). If the limit in non-critical, operational data flow has been reached, the filter may drop the packet 101 or use other methods discuss herein. All data that does not meet the critical or non-critical, operational criterion may be dropped.

FIG. 4 depicts a second exemplary embodiment of the present invention in a flowchart in which non-critical, operational packets of data may be stored before being passed to the media access controller (MAC) 108. A packet 101 may be received by the filter 106 from the physical media (PHY) 104 (block 402). The relevant data within the packet 101 may be identified (block 404). The filter 106 may use, for example, a position and/or a sequence of data within the data payload 122 to determine the location of relevant data. The filter 106 compares the relevant data to predetermined criterion block 406 . The predetermined criterion may be a string of data associated with relevant data found in a critical network packet.

The filter 106 determines if the packet 101 is a critical packet associated with the process control network 110 or if the packet 101 is a non-critical, operational packet (block 408). If the packet 101 is a critical packet ("Yes " branch of block 408), the packet 101 is transmitted to the media access controller (MAC) 108 of the process control network 110 (block 410). If the packet 101 is a non-critical, operational packet ("No " branch of block 408), the packet 101 is counted and added to the amount of non-critical network traffic (block 412). The counter 206 may be used to count only non-critical, operational network traffic as described in this exemplary embodiment or the counter 206 may also be used to count all traffic critical and non-critical, in which case the counting action may occur prior to determining if the packet 101 includes critical or non-critical data.

The filter 106 determines if a process control network traffic threshold has been received (block 414). If the threshold of non-critical, operational network traffic has not been received ("No" branch of block 414), the packet 101 is transmitted to the media access controller (MAC) 108 of the process control network 110 (block 410). If the threshold of non-critical, operational network traffic has been exceeded ("Yes" branch of block 414), the non-critical packet may be stored in a queue (block 416). The queue may be a First In First Out (FIFO) queue. Once the network traffic received by the process control network 110 is below the threshold, the first packet in the buffer 208 is sent to the media access controller (MAC) 108 (block 410).

Persons skilled in the art will appreciate that the present invention can be practiced by other than the described examples and embodiments, which are presented for purposes of illustration rather than of limitation and that the present invention is limited only by the claims that follow.

What is claimed is:

1. A network traffic monitoring device, comprising:
at least one connection to a physical media and to a media access controller; and
a filter comprising:
a position identifier configured to determine a position of specified data within a first packet and a second packet;
a data comparator configured to compare the specified data in the first and second packets to a first control criterion, the first control criterion associated with packets having a higher criticality;
a counter configured to count packets transmitted to the media access controller that do not match the first control criterion during a specified period; and
an access controller configured to (i) pass the first packet to the media access controller when the specified data within the first packet matches the first control criterion and (ii) pass the second packet to the media access controller when the specified data within the second packet does not match the first control criterion and the counter has not counted a threshold number of packets.

2. The network traffic monitoring device of claim 1, wherein the network traffic monitoring device is an ingress to a level 1 network.

3. The network traffic monitoring device of claim 1, wherein the filter is a field programmable gate array.

4. The network traffic monitoring device of claim 1, wherein the first control criterion identifies at least one of: critical network housekeeping data, network redundancy data, maintenance data, and process control mission data.

5. The network traffic monitoring device of claim 1, wherein:
the data comparator is configured to compare the specified data in the first and second packets to a second control criterion; and
the counter is configured to count packets transmitted to the media access controller that do not match the first control criterion and that match the second control criterion during the specified period.

6. The network traffic monitoring device of claim 1, further comprising a buffer, wherein the access controller is configured to store a third packet in the buffer when specified data within the third packet does not match the first control criterion and the counter has counted the threshold number of packets.

7. The network traffic monitoring device of claim 1, wherein the access controller is configured to signal an administrator when specified data within a third packet does not match the first control criterion and the counter has counted the threshold number of packets.

8. A network traffic monitoring method comprising:
receiving first and second packets from a physical media;
identifying a position of specified data within the first and second packets;
comparing by a data comparator the specified data to a control criterion;
counting packets transmitted to a media access controller that do not match the control criterion during a specified period, the control criterion associated with packets having a higher criticality;
transmitting the first packet to the media access controller when the specified data within the first packet matches the control criterion; and
transmitting the second packet to the media access controller when the specified data within the second packet does not match the control criterion and a number of packets counted is less than a predetermined threshold number of packets.

9. The method of claim 8, wherein the method is performed at an egress to a level 1 network.

10. The method of claim 8, wherein the method is performed within a field programmable gate array.

11. The method of claim 8, wherein the control criterion identifies at least one of: critical network housekeeping data, network redundancy data, maintenance data, and process control mission data.

12. The method of claim 8, further comprising dropping a third packet when specified data within the third packet does not match the control criterion and the number of packets counted is greater than the threshold number of packets.

13. The method of claim 8, further comprising storing a third packet in a buffer when specified data within the third packet does not match the control criterion and the number of packets counted is greater than the threshold number of packets.

14. The method of claim 8, further comprising signaling an administrator when specified data within a third packet does not match the control criterion and the number of packets counted is greater than the threshold number of packets.

15. A network traffic monitoring filter, comprising:
a position identifier configured to determine a position of specified data within a first packet and a second packet;
a data comparator configured to compare the specified data in the first and second packets to a control criterion, the control criterion associated with packets having a higher criticality;
a counter configured to count packets transmitted to a media access controller that do not match the control criterion during a specified period; and
an access controller configured to (i) pass the first packet to the media access controller when the specified data within the first packet matches the control criterion and (ii) pass the second packet to the media access controller when the specified data within the second packet does not match the control criterion and the counter has not counted a threshold number of packets.

16. The network traffic monitoring filter of claim 15, wherein the network traffic monitoring filter is an ingress to a level 1 network.

17. The network traffic monitoring filter of claim 15, wherein the network traffic monitoring filter is a field programmable gate array.

18. The network traffic monitoring filter of claim 15, wherein the control criterion identifies at least one of: critical network housekeeping data, network redundancy data, maintenance data, and process control mission data.

19. The network traffic monitoring filter of claim 15, wherein the access controller is further configured to drop a third packet when specified data within the third packet does not match the control criterion and the counter has counted the threshold number of packets.

20. The network traffic monitoring filter of claim 15, further comprising a buffer, wherein the access controller is further configured to store a third packet in the buffer when specified data within the third packet does not match the control criterion and the counter has counted the threshold number of packets.

* * * * *

UNITED STATES PATENT AND TRADEMARK OFFICE
CERTIFICATE OF CORRECTION

PATENT NO. : 7,593,409 B2
APPLICATION NO. : 11/321564
DATED : September 22, 2009
INVENTOR(S) : Jay W. Gustin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Twenty-first Day of September, 2010

David J. Kappos
*Director of the United States Patent and Trademark Office*